ELECTRICAL SIGNAL ANALYZING SYSTEMS

Filed May 27, 1960

6 Sheets-Sheet 1

VERNON R. BRIGGS
INVENTOR.

BY FRASER AND BOGUCKI
Morris Spector
ATTORNEYS

VERNON R. BRIGGS
INVENTOR.

BY FRASER AND BOGUCKI

Morris Spector

ATTORNEYS

VERNON R. BRIGGS
INVENTOR.

BY FRASER AND BOGUCKI
Morris Spector
ATTORNEYS

VERNON R. BRIGGS
INVENTOR.

BY FRASER AND BOGUCKI
Morris Spector
ATTORNEYS

VERNON R. BRIGGS
INVENTOR.

BY FRASER AND BOGUCKI
[signature]
ATTORNEYS

VERNON R. BRIGGS
INVENTOR.

BY FRASER AND BOGUCKI
Morris Spector
ATTORNEYS 3,134,896
Patented May 26, 1964

3,134,896

ELECTRICAL SIGNAL ANALYZING SYSTEMS

Vernon R. Briggs, Woodland Hills, Calif., assignor to Thompson Ramo Wooldridge Inc., Canoga Park, Calif., a corporation of Ohio Filed May 27, 1960, Ser. No. 32,371
13 Claims. (Cl. 235—181)

This invention relates to systems for analyzing electrical signals which have complex multi-frequency components, and more particularly to systems for ascertaining the existence of, and measuring the relative timing displacement between, mutually coherent signal components of two electrical signals.

Electrical signals which contain complex multi-frequency components are said to contain mutually coherent signal components when each of the signals contains a complex multi-frequency component which conforms substantially to the same amplitude-versus-time function, although there may be differences in the peak amplitude and timing of such components. Thus, these mutually coherent signal components may not be in time coincidence with one another, but may instead be displaced in the time domain by some unknown magnitude of relative timing displacement. Specifically, the timing of the mutually coherent component of one signal may be such that it commences in advance of or, alternatively, after the beginning of its mutually coherent signal component in the other electrical signal.

Electrical signal correlation techniques have been found useful in determining the values of such timing displacement magnitudes. In practicing such techniques, it is conventional to apply both electrical signals to an electrical signal multiplying network in which the two signals are multiplied by one another to produce a product signal. This product signal is then time averaged or "smoothed" as by being applied to a low-pass filter, or to an integrating network exhibiting a substantial time constant. The product signal thus smoothed is sometimes termed a "correlation output signal" because it is directly related in magnitude to the degree to which the mutually coherent components of the two signals are in time coincidence. Stated in another way, the correlation output signal both indicates the concurrent presence of mutually coherent signal components, and provides a measure of the extent to which these components depart in timing from a co-extensive relationship, or from complete correlation.

These electrical signal techniques are particularly well suited to uses in applications where high sensitivity is desired. Through the use of signal correlation, the existence of two signals having mutually coherent signal components may be ascertained despite high ambient noise levels, extremely weak signals, or deliberately created interference. Furthermore, the relative timing displacement between the mutually coherent signal components may be measured to provide useful information.

The value of an unknown magnitude of timing displacement between two electrical signals is conveniently determined by controllably introducing known magnitudes of relative time delay between the two signals prior to their multiplication in the multiplying network. When changing the value of the magnitude of relative time delay which is introduced between the two signals over a range of values prior to application of the signals to the multiplying network, the magnitude of the correlation output signal is observed to follow a generalized function of the form $$\frac{\sin x}{x}$$

Accordingly, the value of the correlation output signal magnitude varies in an oscillatory fashion about a limiting asymptotic value. The value of the correlation output signal magnitude is a maximum when there is a minimum value of relative timing displacement between the signals as they reach the multiplying network, so that with such a relationship the mutually coherent signal components may be considered to be in time coincidence and in complete correlation.

Although signal correlation techniques as thus utilized are of value in many applications, it has heretofore been deemed necessary to compromise some performance features in order to obtain improvements in other respects. Thus, it was heretofore considered necessary for many applications to reduce the speed of operation in order to obtain better discrimination against noise and more accurate correlation between two signals. In other instances, it was not readily possible to eliminate ambiguities when attempting to measure the relative timing displacement which corresponded to complete correlation between the signals. An indication of a time coincident relationship between such mutually coherent components might erroneously be based, for example, on a maximum in the oscillatory correlation function other than the maximum of highest absolute value. This maximum of highest absolute value is termed the "principal maximum" in the correlation function and occurs only when there exists a zero value of relative timing displacement between the mutually coherent components reaching the multiplier.

Those maxima of less absolute magnitude, which occur for values of relative timing displacement other than zero, are termed "lower order" maxima.

In accordance with the present invention, the capabilities of systems using signal correlation techniques may be greatly enhanced by selective modification of the frequency spectrum of the electrical signals which are applied to the signal multiplying network. By modification of the characteristics of the electrical signals to be correlated, the shape of correlation function may be selectively altered along one or both axes to provide operating conditions which ensure speed, accuracy and freedom from ambiguity. The correlation techniques which are used may themselves be modified so as to further enhance these characteristics.

In one example of a system in accordance with the invention, two electrical signals containing mutually coherent signal components are applied to a signal multiplying network through separate, variable, frequency sensitive filter means. The relative timing displacement between the two electrical signals may be changed by a variable delay means, which controllably introduces known values of relative time delay between the two signals. The variable frequency sensitive filter means is then made responsive to the product signal derived from the signal multiplying network, so as to control both the mean frequency of and the frequency band occupied by the mutually coherent signal components which are applied to the signal multiplying network.

An important aspect of the present invention derives from the fact that the value of the mean frequency $f_m$, characterizing the spectral power distribution of the coherent components common to the two signals, may be so established that ambiguities in the measurement of the timing displacement between mutually coherent signals may be obviated. This, in accordance with the present invention, is accomplished by establishing this mean frequency so that timing displacement measurement is restricted to the use of only the principal maximum in the correlation function characterizing the mutually coherent components as they reach the multiplier. In one form of the present invention, the value of the mean frequency $f_m$ is valued as a function of the maximum expected variation in the timing displacement between the two mutually coherent components being correlated.

In accordance with another aspect of the present invention, the value of the magnitude of the correlation output signal is controllably modified by changing the width of the frequency band occupied by the mutually coherent signal components common to the two signals as they are applied to the signal multiplying network, while maintaining the mean frequency at a substantially constant value. The shape of the correlation function curve and the absolute value of the correlation output signal may thus be changed. By reducing the bandwidth, the effects of external noise are minimized. The width of the frequency band occupied by the mutually coherent signal components which are applied to the signal multiplying network may conversely be increased to provide a correlation output signal of higher absolute value, to provide sharper definition of the complete correlation relationship and more accurate measurement of the relative timing displacement between the mutually coherent components of two signals.

A further aspect of the invention is that the mean frequency and the frequency band of the mutually coherent signal components which are applied to the signal multiplying network may be changed concurrently to provide optimum system capability for different phases of operation. Thus, sensitivity to the mutually coherent signal components may be enhanced during phases in which a system is operating to ascertain whether or not mutually coherent signal components do in fact exist. When it has been determined that they do exist, the mean frequency and the width of frequency band may both be modified so that sharper definition of the complete correlation relationship is obtained.

Another aspect of this invention is that the values of the smoothing time of the signal correlation system may be changed as a function of the frequency band of the mutually coherent signal components which reach the multiplying network. The interval over which the correlation output signal from the signal multiplying network is time averaged may be reduced, thus increasing the speed of response of the system, whenever the magnitude of the frequency band of the mutually coherent signal components reaching the signal multiplying network is increased.

A better understanding of the invention may be had by reference to the following description, taken in conjunction with the accompanying drawings, in which.

Figures 5, 6D:
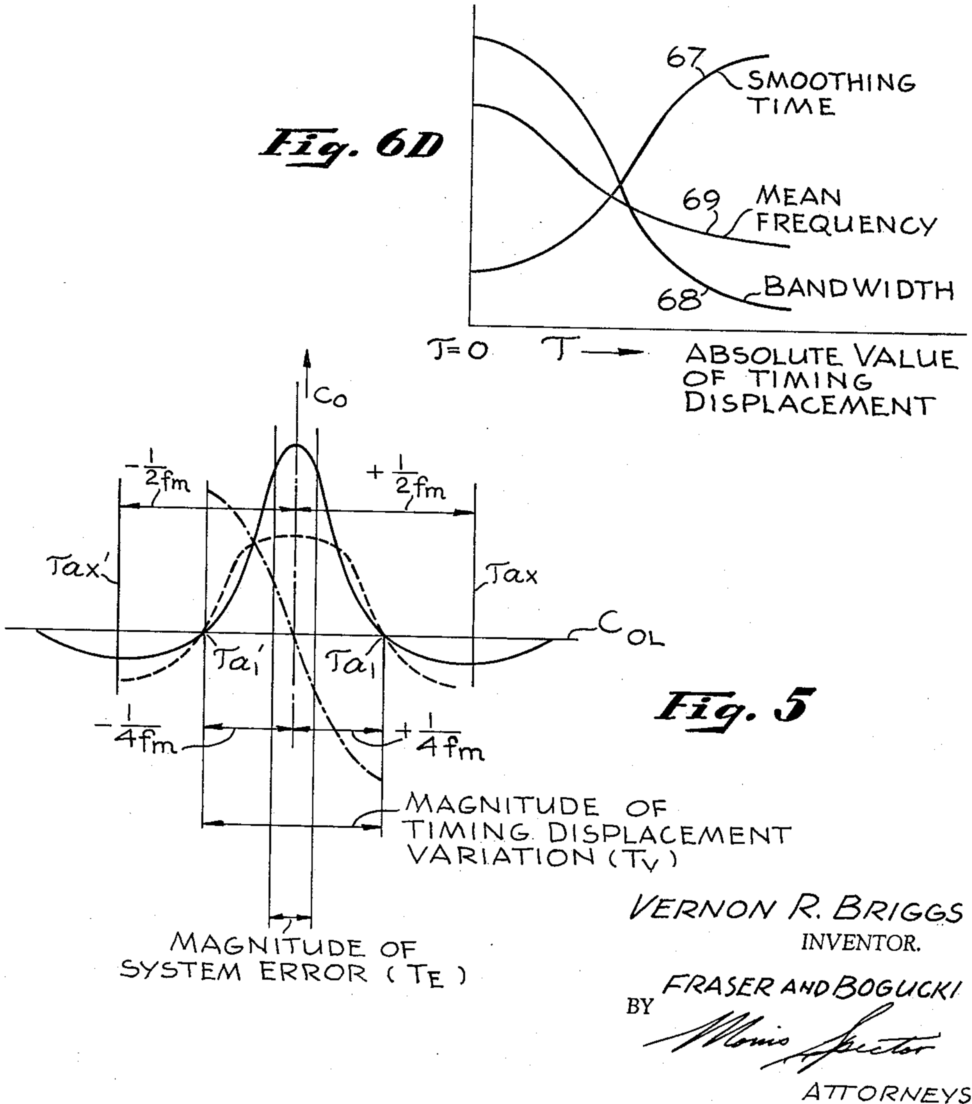
FIG. 5 is a graph of correlation output signal magnitudes versus relative timing displacement magnitudes for different timing relationships.
Figure 7:
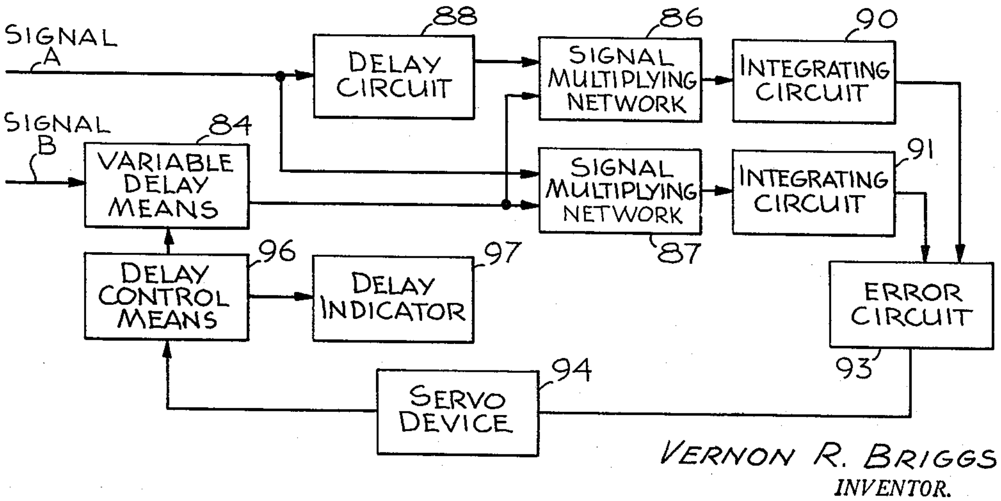
Figure 8:
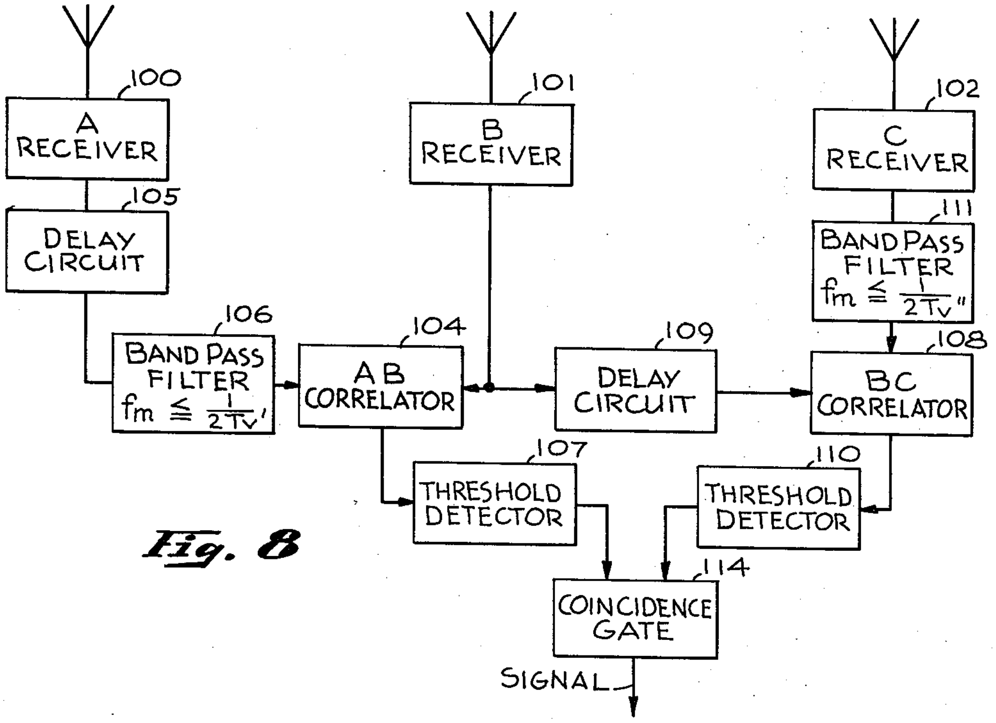
Figure 9:
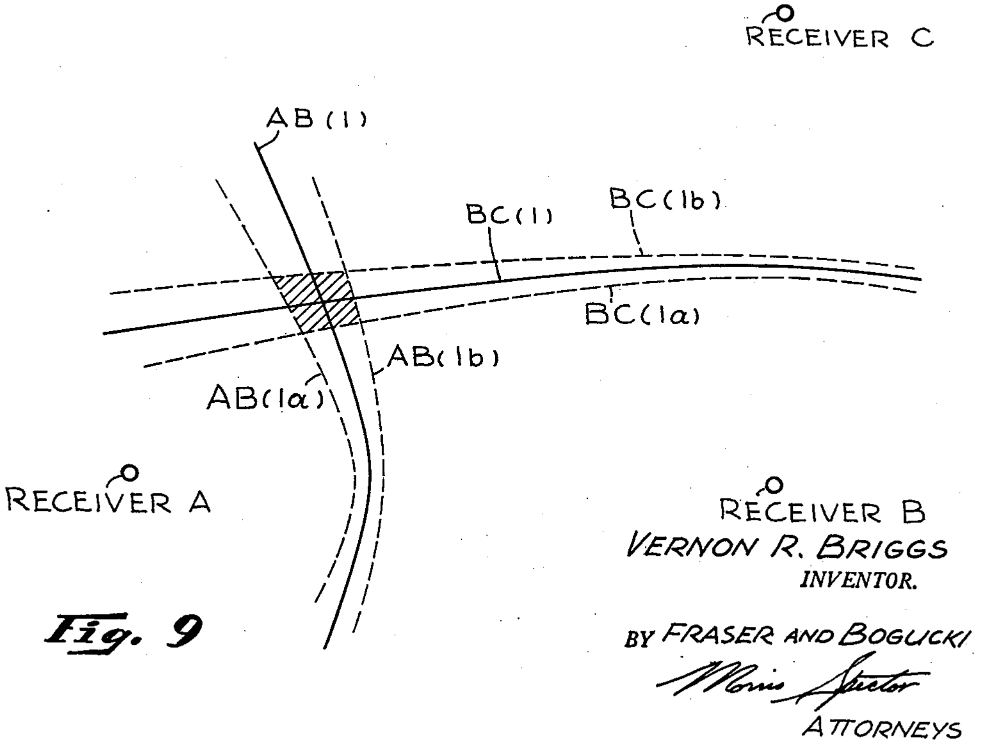

FIG. 6D graphically illustrates various signal relationships;

FIG. 7 is a block diagram of an additional form of signal correlation system which may be employed in conjunction with the present invention;

FIG. 8 is a block diagram representation of a different form of position locating system which may employ the aspects of the present invention; and FIG. 9 is a graph useful in describing the operation of the system of FIG. 8.

Figure 1:
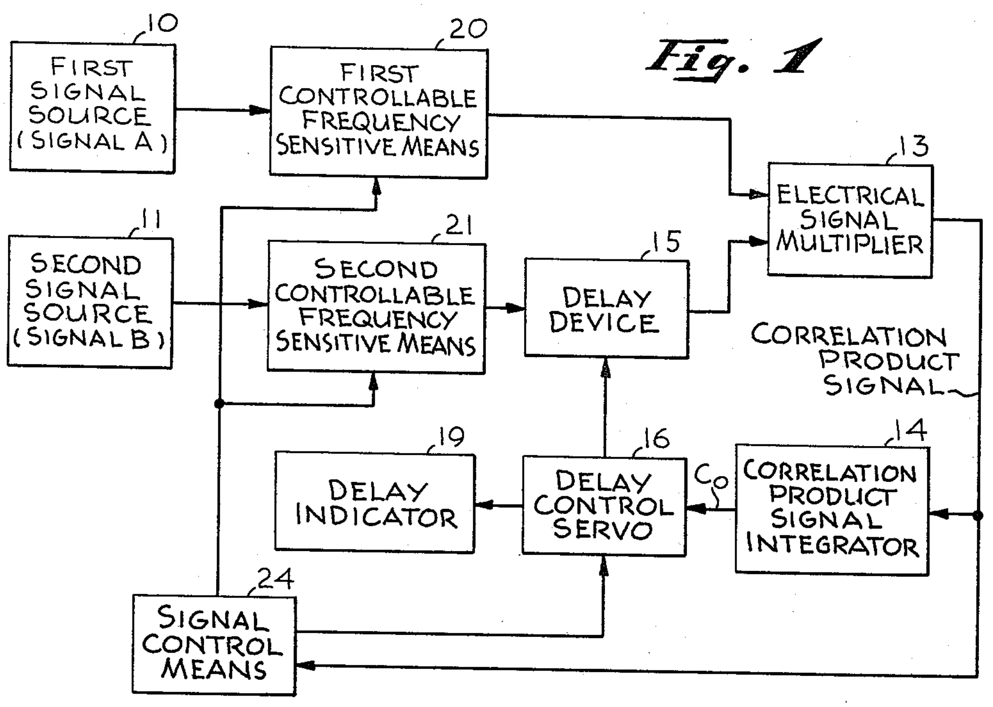
FIG. 1 is a generalized block diagram representation of a system in accordance with the invention.

The broad aspects of the system shown in FIG. 1, to which reference is now made, illustrate how information may be obtained from two signals by determining the timing displacement of mutually coherent signal components in the two signals. Throughout the discussion below, the introductory definitions should be borne in mind in order to maintain the relationships in context. The signals which are to be processed contain mutually coherent signal components and are provided from first and second signal sources 10 and 11. For convenience, one signal may be referred to as signal A and the other may be referred to as signal B. The sources 10 and 11 may be two different signal receivers, each of which is responsive to emanations from a single distant signal generator (not shown). Because the receivers are spaced apart at known locations, the different path lengths from the common source to the different receivers will result in a relative timing displacement between the mutually coherent signal components in the two signals. In many forms of position locating systems, the magnitude of this timing displacement is of course the primary relationship to be determined. Ideally, in order to most usefully make this determination, the system must ascertain rapidly and without ambiguity that mutually coherent signal components in fact exist, and then measure the value of the magnitude of the timing displacement with precision and rapidity.

In accordance with signal correlation techniques, the signals from the first and second signal sources 10 and 11 are applied to an electrical signal multiplier circuit 13, and a correlation product signal is derived, as previously described. The correlation product signal is applied to a correlation product signal integrator 14 to provide the time averaging or smoothing which is desired to derive a correlation output signal.

The elements thus far described constitute the principal components of a system using prior art electrical signal correlation techniques. Also, in the prior art, there is provided means for introducing known magnitudes of relative time delay between signal A and signal B prior to their application to the electrical signal multiplier 13, this means consisting of a delay device 15 which is here coupled between the second signal source 11 and the electrical signal multiplier 13. While the delay device 15 may be controlled manually, it is preferred in the practice of some forms of the present invention to employ an automatic delay control, such as a delay control servo 16 which is coupled to receive the correlation output signal and to control the delay device 15 accordingly. A particularly effective form of control system for the delay device 15 combines the integration of the correlation product signal and the servo control of the delay device 15 in a unified electromechanical system as described in a copending application of Vernon R. Briggs, Serial No. 29,069, entitled "Electrical Signal Analyzing System," and filed May 13, 1960. The integration or time averaging and servo functions may be provided separately, however, in operating the delay device 15 so as to maintain a selected time displacement relationship between signal A and signal B. The extent of movement of the output member of the delay control servo 16 operates a delay indicator 19 which provides a readable indication of the extent of the relative timing displacement between signal A and signal B, when the system is so adjusted, by the operation of the delay device 15, that the delay device 15 compensates for the initial relative timing displacement between the mutually coherent signal components of the two signals.

Figure 2:
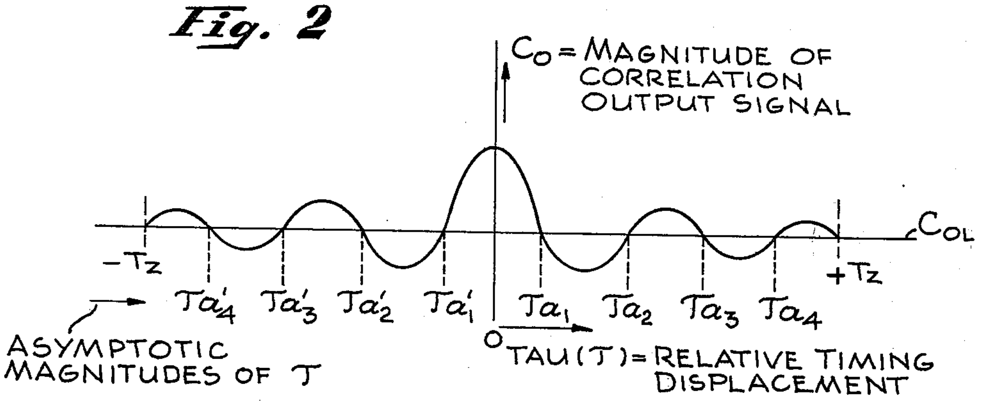
FIG. 2 is a graph of the magnitude of a correlation output signal versus the relative timing displacement.

Referring now to FIG. 2, there is shown a graph of the value of the magnitude of the correlation output signal $C_O$ for different magnitudes of relative timing displacements between the mutually coherent components of two signals as they are in fact multiplied together, these timing displacement magnitudes being assigned the symbol tau ($\tau$). The plot of the values of magnitude $C_O$ vs. the values of magnitude $\tau$ may be seen to take the form of the mathematical function $$\frac{\sin x}{x}$$

Certain observations and definitions may now be undertaken upon inspection of the function represented by the curve of FIG. 2. It will be noted that the curved line depicting the function appears to oscillate in magnitude about a limiting asymptotic value $C_{OL}$ of the magnitude $C_O$, and crosses this limiting asymptotic value of magnitude a plurality of times over the range of time delay magnitudes $-T_Z$ to $+T_Z$. It can also be seen that the absolute value of the correlation signal output magnitude is maximum for a value of relative timing displacement of $\tau=0$. This value, $\tau=0$, corresponds to the relationship in which the mutually coherent components of the two signals applied to the electrical signal multiplier are in time coincidence. When this relationship is obtained, the signals may also be spoken of as being co-extensive in time and/or in complete correlation. Thus, the absolute value of relative time delay introduced between the two signals which produces this maximum can be taken to be substantially equal to the value of the initial magnitude of timing displacement between signals A and B, which value it is sought to determine. The mathematical function $C_O=f(\tau)$ which results from the correlation of signal A with signal B as depicted by the curved line of FIG. 2 may be conveniently thought of as the "correlation function" characterizing the mutually coherent components of the two signals.

In order to employ the signals from the sources 10 and 11 to best advantage, systems in accordance with the present invention are so organized as to operate most effectively in each of several different phases, states or conditions of operation. Three different phases may be identified. First, the system begins operation in what is termed a "search" phase in which it may be considered to be "searching" for signals having mutually coherent components, that is, determining whether or not a component of signal A is coherent with a component of signal B. Then, in a second phase, an approximate measurement is made of the magnitude of the relative timing displacement between the two specific coherent components of the two signals sensed during the "search" phase. This may be referred to as an "acquisition" phase. Finally, in the third phase, the system operates automatically and continuously with increased sensitivity, to provide an extremely accurate indication of the magnitude of relative timing displacement between the specific mutually coherent signal components of the two signals even though the value of this magnitude changes with time. This third phase may therefore be referred to as a "track" phase.

It will be recognized that the conditions under which mutually coherent signal components may be perceived against a strong noise or other interfering signal background in the search phase may be materially different than the conditions involved in ascertaining how the mutually coherent signal components are related in timing, as roughly sensed during the acquisition phase. Similarly, the conditions which are to be met in the search and acquisition phases may differ appreciably from those encountered in the track phase, in which precise and possibly continuously changing measurements are obtained. It will also be recognized that there may not be a distinct demarcation between any of the successive phases, and that these terms are used to identify the principal conditions of operation.

Systems in accordance with the present invention, referring again to FIG. 1, permit most expedient handling of the three different operating phases, through use of frequency sensitive means in the circuits which couple the first and second signal sources 10 and 11 to the electrical signal multiplier 13. In accordance with the present invention, the frequency selective means operate, as more fully described hereinafter, to modify or tailor the spectral power distribution of those mutually coherent signal components common to the signals reaching the electrical signal multiplier. To this end, it is contemplated that only one of the frequency selective means 20 or 21 need be used since it is desired to control the spectral power distribution of components common to the signals reaching the multiplier. Such means may comprise known forms of band pass filters and frequency selective signal attenuators for controllably modifying the spectral distribution of signal energy in accordance with an electrical control signal applied to such filters and attenuators. Mechanical control of such filters and attenuators is, of course, contemplated where such control is carried out in accordance with the principles of the present invention.

Thus a first controllable frequency sensitive means 20 is employed to couple signal A from the first signal source 10 to the electrical signal multiplier 13, and a second controllable frequency sensitive means 21 likewise couples signal B from the second signal source 11 to the delay device 15 for application to the electrical signal multiplier 13. The two controllable frequency sensitive means 20 and 21 have, as indicated above, variable bandpass characteristics which are electrically or mechanically controllable, so as to vary both the width of the frequency band occupied by the signals reaching the multiplier, and also the mean frequency of the spectral power distribution of such signals. Here it is assumed that the devices are mechanically controllable. A signal control means 24 coupled to receive the correlation product signal from the electrical signal multiplier 13 is arranged to control the transmission characteristics of the first and second controllable frequency sensitive means 20 and 21, as described above. In addition, the signal control means 24 is coupled to the delay control servo 16 so as to modify the characteristics of the servo 16, in accordance with the different phases of operation.

It will be shown in detail hereinafter that the characteristic shape of the correlation function of FIG. 2 may be modified to best advantage in each of the different phases of operation through proper control of either or both of the frequency sensitive means 20 and 21. When the system is operating in the search phase, the spectral power distributions of the signals applied to the electrical signal multiplier 13 are modified in such a way that those coherent components common to the two signals are characterized by a relatively low mean frequency and occupy a relatively narrow frequency band. Further, the value of the mean frequency is selected with relation to the maximum variation in timing displacement which is expected or which is to be observed between the signals from the two signal sources 10 and 11. During the succeeding acquistion and track phases, the mean frequency of the common coherent frequency spectrum characterizing the signals reaching the multiplier 13 is made progressively higher, and the bandwidth occupied by these signals is made progressively wider. The relationships which are observed ensure that there is no ambiguity in measuring the timing displacement of the two signals. Also, in accordance with the present invention, the shape of the correlation function is thus so controlled that noise discrimination is emphasized during the acquisition phase, while precision in the measurement of relative timing displacement is emphasized during the track phase. Furthermore, the amount of smoothing applied to the correlation product signal in providing the correlation output signal $C_O$ is changeably optimized throughout each phase of operation and from one phase of operation to another. Where greater precision is needed in defining the correlation relationship, the amount of smoothing time is changed in accordance with the value of the magnitude of the correlation product signal. Thus, in accordance with one aspect of the present invention, the greater the degree of time coincidence between the mutually coherent components reaching the multiplier, the greater will be the smoothing time constant imposed on the product signal delivered by the multiplier.

Figure 3:
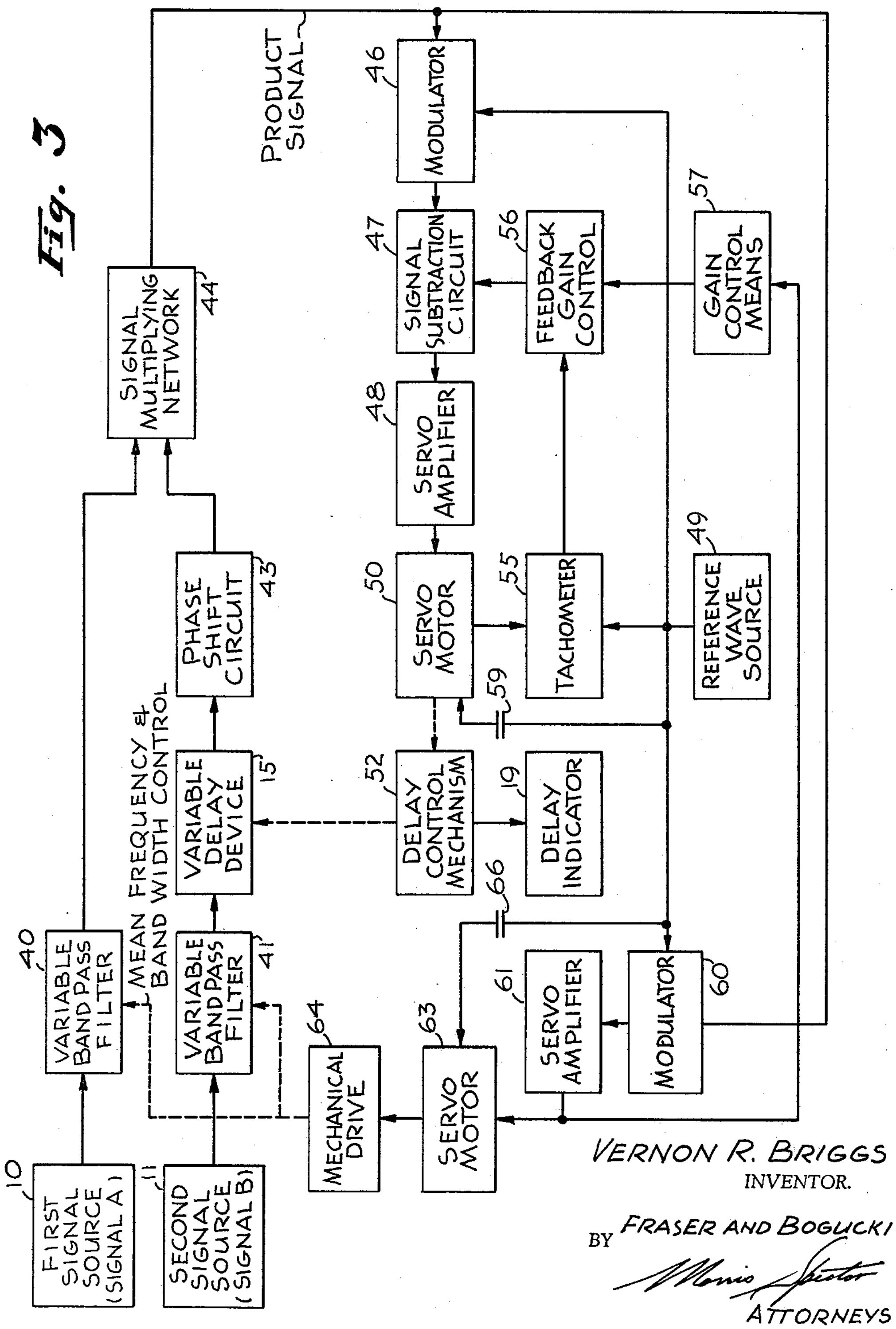
FIG. 3 is a block diagram representation in greater detail of a system in accordance with the present invention.

The way in which these features are provided, in accordance with the present invention, will be better understood by reference to the more detailed block diagram of FIG. 3, in which two signals A and B containing mutually coherent signal components are derived from first and second signal sources 10 and 11, respectively. Each of the signals is passed through a different one of two variable bandpass filters 40, 41 respectively. Signal B from the second signal source 11 is further directed through a variable delay device 15 and also through a phase shift circuit 43. Signal A, from the first signal source 10, is applied without any delay to one input of a signal multiplying network 44. A fixed delay may be imposed on signal A if needed to bring the mutually coherent components of signal A and signal B into time coincidence at the multiplying network through the action of variable delay device 15. Signal B, from the second signal source 11, is applied, after delay in variable delay device 15 and after a phase shift in the phase shift circuit 43, to the remaining input of the signal multiplying network 44. Inasmuch as the purpose of the variable delay device 15 is to change the relative timing displacement between the components of signals A and B, the variable delay device 15 may be coupled in either of the signal paths. The purpose of the phase shift circuit 43 is to provide a fixed 90° phase shift of all monofrequency components in one signal relative to the other signal for purposes which are described in more detail below.

The correlation product signal derived from the signal multiplying network 44 is substantially the derivative of the correlation product signal discussed in conjunction with FIG. 1 and FIG. 2 due to the 90° phase shift of monofrequency components introduced by the phase shift circuit 43. In FIG. 3, the product signal from the multiplying network 44 is applied to a servo system which employs negative feedback to provide both electromechanical control of the variable delay device 15 and the desired integration or smoothing of the product signal. In the servo system, the product signal is applied to a modulator 46, output signals from which are coupled to one input of a signal subtraction circuit 47 whose output terminal is coupled to the input terminal of a servo amplifier 48. It is preferred to employ, for the signal multiplying network 44, a circuit which has a small time constant. The modulator 46 is therefore driven from a reference wave source 49 so as to generate an alternating current signal modulated in accordance with the direct current variations of the product signal. The output signals from the servo amplifier 48 are applied to control the operation of a servo motor 50. An output shaft or other member (not shown in detail) of the servo motor 50 is mechanically coupled to control the positioning of a delay control mechanism 52 which in turn operates the variable delay device 15.

With the elements thus far described, the desired control of the variable delay device 15 in accordance with the product signal is achieved by generating an alternating signal component in the modulator 46 to drive the servo motor 50 so as to change the variable delay device 15, through operation of the delay control mechanism 52, to an extent dependent upon the amplitude of the product signal. A smoothing or time averaging of the product signal is introduced, however, through the use of a feedback action by means which include a tachometer 55 coupled to be driven by the servo motor 50 and a feedback coupling to the remaining input of the signal subtraction circuit 47. The coupling from the tachometer 55 to the signal subtraction circuit 47 is made through a feedback gain control 56 which operates under control of a gain control means 57. Necessary excitation of the servo motor 50 windings is provided from the reference wave source 49 through a phase shift capacitor 59 in a conventional manner. The tachometer 55 is also driven from the reference wave source 49 in synchronism with the modulator 46 so that signals delivered by it and applied to the signal subtraction circuit 47 at its two input terminals are in proper phase relationship to one another. Operation of the gain control means 57 is made responsive to a control signal the mean amplitude of which is dependent upon the magnitude of the product signal in a manner described in more detail below. The feedback gain control 56 may be a mechanically operable or electronically controllable device and the combination of the feedback gain control 56 and the gain control means 57 may provide linear or non-linear, as desired, modification of the feedback signal in response to the correlation product signal.

The feedback signal generated by the tachometer 55 is applied to the signal subtraction circuit 47 in a sense to oppose the signal provided from the modulator 46. Therefore, a negative feedback action is established, with the amount of the negative feedback signal being determined by the feedback gain control 56. The amount is selected to be such that appreciable opposition to the operation of the servo motor 50 is introduced by the feedback signal. Therefore, the signal which drives the servo motor 50 is in effect "smoothed." The negative feedback coupling therefore is utilized to derive the time averaging of the product signal which is needed to develop desired signal correlation information.

The variable band pass filters 40 and 41 and the gain control means 57 are operated under the control of a servo system which includes a modulator 60 to which the product signals from multipling network 44 are applied. Reference waves from the source 49 are also applied to the modulator 60, the output terminal of which is coupled to a servo amplifier 61. The output terminal of the servo amplifier 61 is coupled to the gain control means 57, and also to a servo motor 63 which drives the controls of the variable band pass filters 40 and 41 through a mechanical drive 64. Excitation for the servo motor 63 is provided through a connection including a phase shift capacitor 66 coupled to the reference wave source 49.

In operation, the arrangement illustrated in FIG. 3 provides the three general phases of operation, to-wit: searching, acquisition and tracking. The signals derived from the first and second sources 10 and 11 are applied to the signal multiplying network 44 to provide a product signal. The value of the magnitude of the product signal, and the subsequently derived derivative of the correlation output signal, is dependent upon the amount of relative delay introduced between the mutually coherent components of the two signals as they reach the multiplying network 44. When the variable delay device 15 provides sufficient delay for the signals to have their mutually coherent signal components in time coincidence, the signals applied to the signal multiplying network 44 are in such relation that a minimum product signal results. The presence of the phase shift circuit 43 effectively places the monofrequency components of the time coincident, mutually coherent signal components in phase quadrature, so that when multiplied together the average value of the product is essentially zero.

When the relative timing displacement between the mutually coherent signal components of the two signals shifts, however, the amplitude of the product signal increases correspondingly. The electrical sense with which the product signal increases, that is either negatively or positively, is then dependent upon the lead-lag relationship of the signals from the two sources 10 and 11. The product signal is thus usable as an error signal for controlling the servo system which governs the positioning of the variable delay device 15. As previously described, however, the functions of positioning the delay device 15 and signal smoothing are provided by the same apparatus, through the use of the negative feedback arrangement in conjunction with the servo motor 50. Assuming that a product signal of relatively high amplitude is applied to the modulator 46, the output signals from the signal subtraction circuit 47 and the servo amplifier 48 will momentarily be of relatively high amplitude. Thus the servo motor 50 will tend to move the delay control mechanism 52 at a relatively high rate of speed to adjust the variable delay device 15 in a sense to minimize the correlation product signal. The relatively fast servo motor 50 movement, however, causes the tachometer 55 to generate a relatively large feedback signal, and when applied to the signal subtraction circuit 47 this feedback signal results in slowing down the action of the servo motor, thus producing the desired time averaging in the signal correlation process.

Accordingly, a continuous tracking operation is maintained, in which the delay control mechanism 52 is caused to adjust the variable delay device so that representations of signals A and B which are passed by the variable band pass filters 40 and 41 are placed in a relationship in which their mutually coherent signal components are in time coincidence. The magnitude of time delay introduced by the variable delay device 15, when this event transpires, provides a measure of the timing displacement between the two signals, and the delay indicator 19 is coupled to provide a useful indication of this measure.

In accordance with one aspect of the present invention, the mean frequency of the mutually coherent components of the two signals which are applied to the multiplying network is controlled by modifying or controlling the spectral power distribution of the signals which reach the multiplier 44. For any two such signals, certain facts about the total spectral power distribution, and the distribution of coherent components, are either known or can readily be determined. A better understanding of these relationships may be had by reference to FIG. 4, in which it may be seen that the significant components of signal A embrace a frequency range from $f_1$ to $f_{10}$ and that the significant components of signal B embrace a frequency range from $f_2$ to $f_9$. The mutually coherent components of signal A and signal B, however, embrace a frequency range from only $f_3$ to $f_5$. Useful correlation of signal A with signal B, in the manner described above, so as to produce signals in accordance with the relationship defined by the correlation function depicted in FIG. 2, therefore, depends solely upon those components in the respective signals which fall within the frequency range of $f_3$ to $f_5$.

Figure 4:
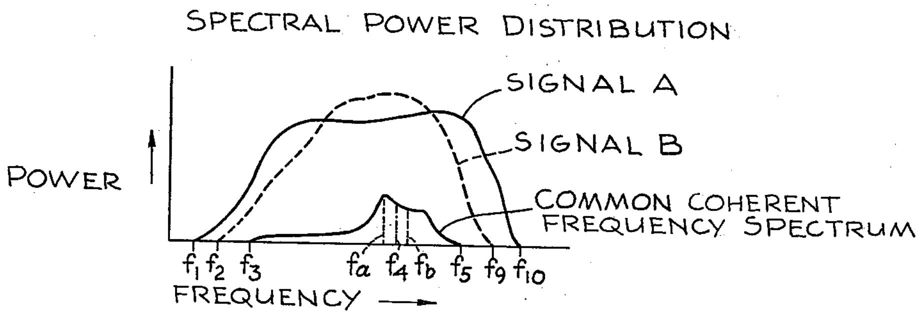
FIG. 4 is a graph of spectral power distribution of two electrical signals containing mutually coherent signal components.

It is apparent, from the spectral power distribution of the mutually coherent components of the two signals represented in FIG. 4, that the value of the mean frequency of this spectral power distribution may be depicted as falling at approximately $f_4$. That is, the power contributed by mutually coherent components in the frequency range $f_3$ to $f_4$ is substantially equal to the power contributed by those components in the frequency range $f_4$ to $f_5$. Thus, the frequency value $f_4$ may be regarded as the "mean frequency" of the "coherent frequency spectrum" which is common to both of the two signals. Alternatively, this mean frequency may also be termed the mean frequency of the "common coherent frequency spectrum" of the two signals.

In the arrangement of FIG. 3, therefore, the variable band pass filters 40, 41 are controlled not with regard to the total frequency spectrum of signal A and signal B, but with concern only as to the character of the common coherent frequency spectrum of the two signals and specifically the mean frequency of this spectrum, as will become apparent hereinafter.

In accordance with another aspect of the present invention, the mean frequency of the common coherent frequency spectrum characterizing the signals applied to the signal multiplying network 44 is established at a value which is dependent upon the maximum variation of interest in the value of the relative timing displacement between the mutually coherent signal components of the two signals. For an appreciation of this aspect, reference should again be made to FIG. 2. There it can be seen that the limiting asymptotic value $C_{OL}$ is effectively crossed by the curve representing the correlation function at successively larger values of magnitude of $\tau$. At these points of crossing, the values of $\tau$ may be termed the "asymptotic magnitudes of relative timing displacement" between the two signals within the multiplying network. A few of the values of such asymptotic magnitudes of $\tau$ are shown at $\tau a_1$, $\tau a_1'$, $\tau a_2$, $\tau a_2'$, $\tau a_3$ and $\tau a_3'$. It is to be noted that the correlation function depicted by the curved line is substantially symmetrical about the $C_O$ axis and that the absolute values of $\tau a_1$ and $\tau a_1'$ are therefore substantially equal. Likewise, the absolute values of each other symmetrical pair of asymptotic magnitudes of $\tau$ are substantially equal. That symmetrical pair of asymptotic magnitudes of $\tau$ which have the smallest absolute value, relative to $\tau=0$, may be considered as the first order asymptotic magnitudes of $\tau$, these being the pair of magnitudes depicted by the values $\tau a_1$ and $\tau a_1'$. The pairs of asymptotic magnitudes of $\tau$ of successively larger values may be considered as the second order, third order, and so forth, asymptotic magnitudes of $\tau$. In similar fashion, the curve representing the correlation function is seen to have a plurality of maxima, with a single first order or "principal" maximum lying on the $\tau=0$ axis. The remaining, lower ordered, maxima appear in pairs, with the members of any given pair being disposed symmetrically with respect to $\tau=0$.

The curve represented in FIG. 2 has, as previously described, substantially the form of a $$\frac{\sin x}{x}$$

function. When the variable $x$ is substantially unity, the first order maximum and the lower order maxima are of substantially the same absolute value of magnitude. The asymptotic magnitudes of $\tau$ occur at values which are determined by the sine function. Therefore, the values of the first order asymptotic magnitudes of $\tau$ are equal to $$\frac{+1}{4f_m}$$

and $$\frac{-1}{4f_m}$$

respectively, where $f_m$ represents the mean frequency of the common coherent frequency spectrum of the two signals reaching to the signal multiplying network 44.

The relationship between the value of $f_m$ and the first order asymptotic magnitudes of $\tau$ is shown graphically in FIG. 5. Where, taking the example of FIG. 4, the mean frequency $f_4$ in the frequency range of $f_3$ to $f_5$ is the mean frequency of the common coherent frequency spectrum characterizing the signals reaching the signal multiplying network, the absolute values of the first order asymptotic magnitudes of $\tau$ are substantially equal to $$\frac{1}{4f_4}$$

As the value of $f_m$ is increased, this relationship shows that the first order asymptotic magnitudes of $\tau$ will occur at correspondingly smaller absolute values of $\tau$. By recognition of this fact, and by the provision of means in accordance with the invention for taking advantage of this fact, the utility of many types of signal correlation systems are materially enhanced.

In accordance with another aspect of the present invention, the relation between the mean frequency of the common coherent frequency spectrum of the two signals applied to the signal multiplying network, and the value of the magnitude of the timing displacement variation which is of interest may be employed to eliminate ambiguities in operation. Here again, reference should be made to FIG. 5, and specifically to the portion of the solid line correlation function curve which defines the principal or first order maximum which, in turn, falls between the values $\tau a_1'$ to $\tau a_1$. As noted, these values are defined by the selected value of mean frequency $f_m$. There are also shown a dotted line curve and a combined dot-and-dash line curve. The solid and dotted line curves represent the results of differently modifying the common coherent frequency spectrum, so as to provide different correlation function curves. The dot-and-dash line curve, on the other hand, represents the derivative of the correlation function described briefly above as resulting from a 90° phase shift of all monofrequency components which define one of the mutually coherent components. All three curves, however, are representative of conditions of operation in which the same mean frequency is used. The solid and dotted line curves pertain to the operation of what may be called a "peak finder" system, such as is described with respect to FIG. 7 below, while the combined dot-and-dash line curve pertains to a "zero crossing" finder such as the system of FIG. 3.

With the zero crossing finder type of system, operation at values of magnitude of $\tau$ which are greater than the primary asymptotic magnitudes may result in the system automatically seeking an erroneous maximum or zero value, by tracking on a wrong zero crossing. With the peak finder type of system, the first order maxima which it is desired to track upon may be lost at absolute values of $\tau$ greater than $\tau_{ax}$ and $\tau_{ax}'$, which designate the first order minima in FIG. 5.

Systems in accordance with the present invention, therefore, employ values of $f_m$ which are small enough to define primary asymptotic values of $\tau$ (for the zero crossing finder type of system) or first order minima (for the peak finder type of system) which encompass all timing displacement variations of interest. A selected range of timing displacement variations is shown as $T_v$ in FIG. 5, as one example. The timing displacement variations of interest will vary in accordance with the circumstances, but may include ranges of values of the magnitude $\tau$ which are symmetrically placed with respect to the value $\tau=0$, or embrace a range of values which are asymmetrically placed.

Where systems in accordance with the present invention are required to undertake the search phase of operation, therefore, the value of the mean frequency of the common coherent frequency spectrum is selected such that $f_m$ is substantially no greater than $$\frac{1}{2T_v}$$

with the zero crossing finder type of system. With the peak finder type of system, the spectrum is selected such that $f_m$ is substantially no greater than $$\frac{1}{T_v}$$

When such relationships are observed, all timing displacement variations of interest will be encompassed and no ambiguities will arise due to this cause in the operation of the system.

Another aspect of the present invention relates to modification of the mean frequency in accordance with the phase of operation in which the system is engaged. The lower the value of the mean frequency, $f_m$, as previously discussed, the more widely separated will be the first order asymptotic magnitudes or the first order minima of $\tau$. The greater this separation, the more gradual will be the slopes of the solid and dotted line curves of FIG. 5, (assuming that the spectral energy distribution remains unchanged and that the bandwidth is not altered). For a given change in $\tau$ with the curves of lesser slope, there is a smaller change in the output signal generated by the system. By increasing the mean frequency $f_m$ during operation, the resultant increase in the slope of the correlation function curve permits sharper definition of the correlation function relationship.

In the arrangement of FIG. 3, the first and second variable band pass filters 40 and 41 are controlled during the different search, acquisition and track phases so that the mean frequency of the signals reaching the signal multiplying network 44 gradually increases. When starting a correlation, the mechanical drive 64 which is coupled to the variable band pass filters 40 and 41 initially maintains the mean frequency of the signals passed by the filters at a relatively lower value within the common coherent frequency spectrum. The product signal is provided through the modulator 60 and servo amplifier 61 to the servo motor 63, which causes the mechanical drive 64 to make an adjustment of the filters 40, 41 in response to the absolute value of the product signal. As the system operates to diminish the absolute value of the product signal, therefore, a gradual increase is made in the mean frequency of the common coherent frequency spectrum reaching the signal multiplying network 44, thus providing a sharper definition of the timing displacement relationship between the signals A and B, independently of the bandwith of the signals.

Some of the advantages of the continuous transition thus provided may also be achieved through the use of clearly defined phases, by switch-operated equipment which changes in steps between the successive phases. Thus, different band pass filters may be employed in each channel, one filter being used for the search and acquisition phases, for example, and another filter being used for the track phase. Threshold detection equipment may be employed, and upon ascertainment of the maintenance of the correlation product signal at less than a selected amplitude for a selected duration, the system may switch from the filters which pass the relatively lower mean frequency to those which pass a relatively higher mean frequency. The present arrangement, however, permits cooperative uses of several advantageous features, as is described below in conjunction with FIG. 6D below, and, therefore, is preferred for most applications.

A further aspect of the present invention is based upon the modification of the shape of the correlation function which characterizes the mutually coherent components of two signals, without substantially changing the absolute values of the first order asymptotic magnitudes of $\tau$. The magnitude of the frequency range which is embraced by the common coherent frequency spectrum which reaches the multiplying network may be selectively controlled, while at the same time the mean frequency of the common coherent frequency spectrum may be kept constant. This is illustrated by reference to the solid and dotted line curves of FIG. 5, taken in conjunction with FIGS. 2 and 4 above. By way of example, let it be assumed that the function depicted by the dotted line curve is based upon the correlation of those mutually coherent components of signal A and signal B which embrace a frequency range $f_a$ to $f_b$, as indicated in FIG. 4. This result may be accomplished by inserting at least one band pass filter having a band pass characteristic which effectively embraces the frequency range of $f_a$ to $f_b$ in either one or both of the signal channels feeding the multiplying network of the arrangement of FIG. 3. Again in should be noted that the mean frequency is the mean frequency in a power sense, and that the coherent components of the two signals which lie on each side of the mean frequency within the band of interest contribute substantially equal power.

If now the magnitude of the common coherent frequency spectrum which reaches the signal multiplying network is increased to embrace the frequency range of $f_3$ to $f_5$, as by removing the aforementioned band pass filter, the resulting correlation function has an appearance substantially as shown by the solid line curve of FIG. 5. The function depicted by the solid line curve is seen to have a higher maximum value of magnitude $C_O$ than the function depicted by the dotted line curve, the dotted line curve more closely resembling the cosine function while the solid line curve more closely resembles the accentuated $$\frac{\sin x}{x}$$

function. Both of the first order asymptotic magnitudes of $\tau$ for these functions are substantially the same, however, as shown at $\tau a_1'$ and $\tau a_1$. Thus, in accordance with the present invention, it is feasible to modify the shape of the correlation function about given values of asymptotic magnitudes of $\tau$ by controlling the magnitude of the frequency range embraced by the common coherent frequency spectrum which reaches the multiplying network, even though the mean frequency of this spectrum is kept at substantially the same value.

The effects of the utilization of these relationships include improvement of the capability of the system for searching for, acquiring and tracking signal sources. By restriction of the band pass during the search and acquisition phases, the signal components which are applied to the signal multiplying network in the correlation system are accompanied by relatively lesser amounts of noise. Therefore, the signal-to-noise ratio is improved and the capability of the system for initial ascertainment of the fact that mutually coherent signal components are in fact present is enhanced.

The increase of the limits of the frequency band within the common coherent frequency spectrum effectively increases the correlation output signal, for a given relative timing displacement, so that more accurate tracking may be obtained in the track phase of system operation. Because of the sharper rate of change of the correlation functions represented in FIG. 5, when the broader bandwidth is used, a control system may more accurately follow a given maxima or zero crossing relationship.

In a preferred form of the present invention, as illustrated in FIG. 3, the bandwidths of the signals passed by the variable band pass filters 40 and 41 are changed in a continuous fashion as the correlation product signal diminishes in value. Thus, after the signals which are searched for are acquired, the bandwidth is continually increased to secure greater precision. It should be noted that once the signals have been identified as containing mutually coherent signal components, and an approximate timing displacement relationship has been established, the concomitant presence of noise is of less effect.

Further, in accordance with the invention, the mean frequency of the signals reaching the signal multiplying network is controlled with respect to the inherent system error at any instant, as well as the variation of interest $T_v$ in the timing displacement. At any of the phases of system operation, there exists an inherent system error in timing displacement because of a number of factors, including internal noise, mechanical backlash, incomplete correlation and the like. Such a variation in timing displacement, designated $T_E$, is shown by way of illustration only in FIG. 5. The instantaneous value of inherent system error, for given operating conditions, establishes the range of values within which the actual relative timing displacement of the mutually coherent signal components of the two signals falls for the given operating conditions. It is an additional aspect of the invention that the mean frequency $f_m$ of the common coherent frequency spectrum reaching the signal multiplying network, at any instant in time, is kept substantially no greater than $$\frac{1}{T_E}$$

where $T_E$ is the value of the inherent system error at that point in time. The relationship thus stated applies to the peak finder type of system, but with the zero crossing type of system, the mean frequency is kept substantially no greater than $$\frac{1}{2T_E}$$

With either type of system, the observation of the appropriate relationship prevents loss of the selected peak or zero crossing. Therefore, it becomes feasible through the use of this relationship to minimize system error by use of longer smoothing times, slower tracking actions and wider bandwidth in conjunction with higher mean frequencies.

When the mean frequency and frequency range of the mutually coherent components of the two signals which are applied to the electrical signal multiplying network are changed concurrently, the changes made are still confined to the common coherent frequency spectrum. The optimization of the various conditions which arrangements, in accordance with the invention, provide is further augmented by the ability of such arrangements to modify the time averaging characteristic of the correlation system. Here, referring again to FIG. 3, the feedback gain control 56 and the gain control means 57 are of importance. In this arrangement, the feedback gain control 56 is operated by the gain control means 57 and the modulator 60 and servo amplifier 61 to provide a maximum feedback signal in response to a given correlation product signal during the search and acquisition phases. The greater the absolute value of the feedback signal in this arrangement the greater is the time-averaging interval which is employed in correlating the signals, through adjustment of the feedback gain control 56 by the gain control means 57. Thus, the correlation, or the identification of the mutually coherent components of the signals, is carried out with greater certainty and precision. Referring again to FIG. 5, it may be seen that the use of greater smoothing time compensates for the lower amplitude correlation output signals which are derived during the search and acquisition phases because of the restriction of the bandwidth in those phases.

Yet another aspect of the present invention may, therefore, be seen to be the provision of a system in which interrelated changes are made within the system between the mean frequency and bandwidth of the common coherent frequency spectrum reaching the signal multiplying network and the smoothing time of the correlation system. The advantages of each of these characteristics may be utilized more fully in accordance with the above teaching to provide rapid, non-ambiguous and reliable acquisition, and high speed and precise tracking of the varied signal relationships between the mutually coherent components. The relationships are illustrated graphically in FIG. 6D, in which are shown generalized curves 67, 68, 69 of different variables plotted against the relative timing displacement of the signals reaching the signal multiplying network. The curves 67, 68, and 69 represent the smoothing time introduced into the product signal and the bandwidth and mean frequency of the signals reaching the signal multiplying network, respectively. During the search and acquisition phases, when the absolute value of the timing displacement is usually large, the value used for the smoothing time is large (curve 67) in magnitude, while the values of the bandwidth and mean frequency (curves 68 and 69) are relatively small in magnitude. Thereafter, each of these characteristics may be changed simultaneously until, when complete correlation exists, at $\tau=0$, the smoothing time curve 67 is at some lower limiting value while the bandwidth and mean frequency are at some upper limiting value. For any given system and given operating conditions, optimum relationships between speed and accuracy may be realized.

Figure 6A:
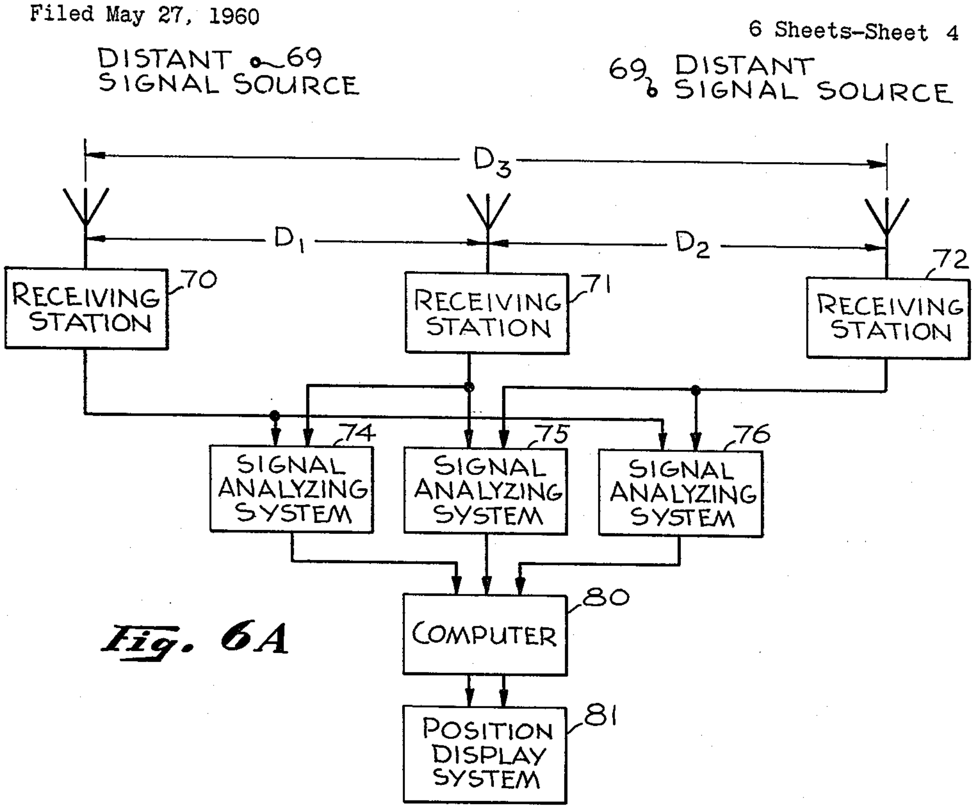
FIG. 6A is a block diagram in generalized form of a position locating and distance determining system using signal analyzing systems in accordance with the present invention.

The manner in which systems, in accordance with the present invention, may be utilized in a practical exemplification is shown, by way of example, in FIG. 6A, to which reference is now made. The system which is described is intended for use in an air traffic control system, particularly a system in which voice modulated radio transmissions from aircraft are to be used as the basis for determining the position of the aircraft. A number of aircraft 69 are indicated generally to denote the fact that aircraft may be distributed throughout a zone in which the present system is to identify the aircraft and to determine their position. For this purpose, three receiving stations 70, 71 and 72 are employed. Each of the receiving stations 70, 71, 72 includes an antenna (shown generally) and is tuned to a frequency selected for the radio transmissions. In the present example, it is assumed for simplicity that each of the aircraft 69 is in radio contact with the others, so that only one is providing an audio transmission on the selected frequency at a given time. Where a number of different frequencies are to be used, however, the receiving stations 70, 71 and 72 may utilize separately tuned units or a sequential tuning operation based upon a fixed or an automatic signal seeking program for successively receiving signals on the same frequency at the same time.

Each of the receiving stations 70, 71 and 72 is spaced apart from the other stations by a fixed and known distance. Thus, a first two of the receiving stations 70 and 71 may be separated by a distance $D_1$, while the second two of the receiving stations 71, 72 may be separated by a different distance $D_2$ and the first and third of the receiving stations 70, 72 may be separated by yet another known distance $D_3$. The separation and spacing of the different receiving stations 70, 71 and 72 are, of course, dependent upon the useful reception range of the signals which are being transmitted from the aircraft 69, as well as the zone which it is intended to cover, and the manner in which the zone is intended to be covered. Although the receiving stations 70, 71 and 72 may be grouped relatively closely together and employed to detect the distance and direction of relatively faraway aircraft, it is preferred in the present example to space the receiving stations 70, 71 and 72 relatively far apart and to determine the location of aircraft positioned somewhere in the spatial zone between the stations. In a practical example, a distance of approximately one hundred miles between receiving stations has been found feasible.

Figure 6B:
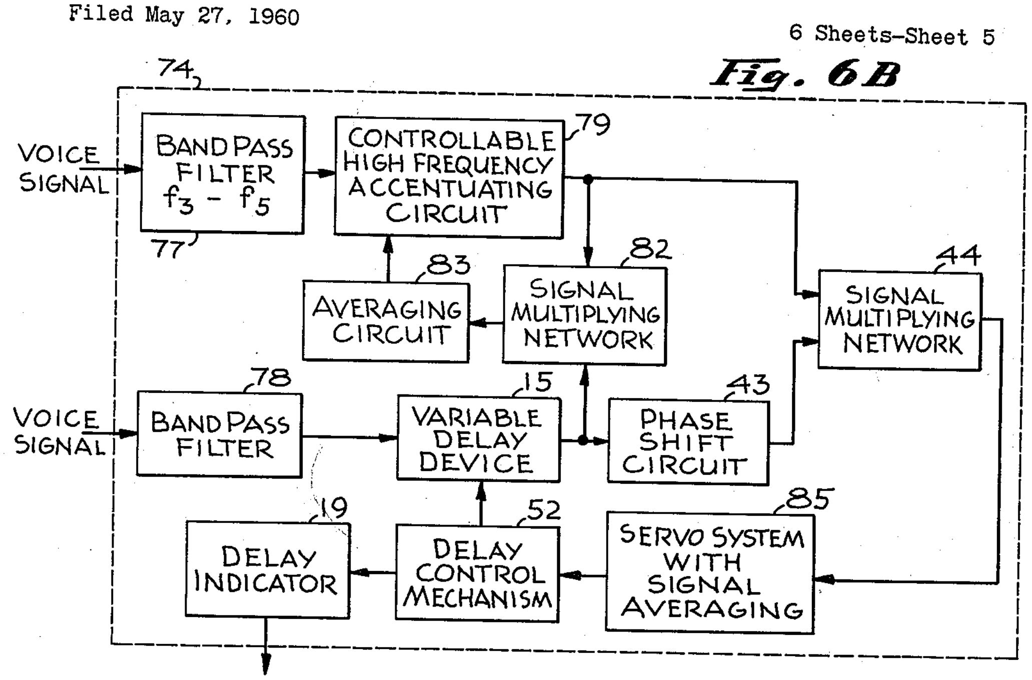
FIG. 6B is another arrangement of a signal analyzing system.
Figure 6C:
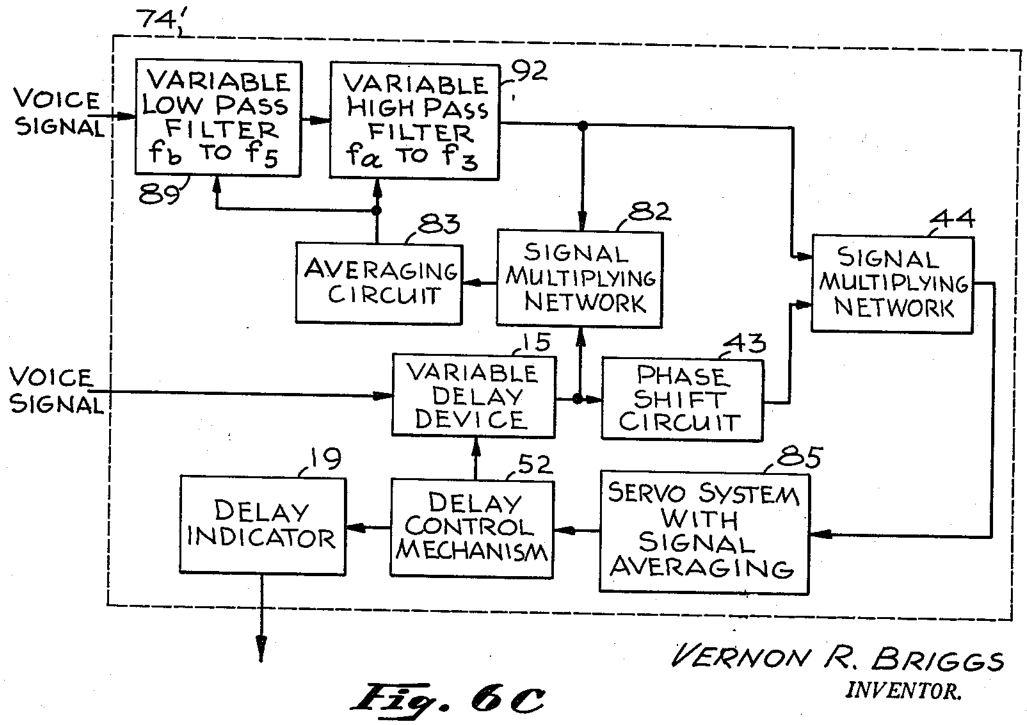
FIG. 6C is a further arrangement of a signal analyzing system.

A number of signal analyzing systems 74, 75 and 76 may be employed in conjunction with the different receiving stations 70, 71 and 72 for providing the necessary timing displacement measurements from which the location of a given aircraft may be determined. Each of the signal analyzing systems, 74, 75 and 76, is generally of the type heretofore described in conjunction with FIG. 3, in which a pair of signals A and B containing mutually coherent signal components may be analyzed to determine the relative timing displacement of the coherent components. It may be more convenient or advantageous, however, to employ signal analyzing systems using other arrangements in accordance with the invention. Thus, systems 74, 74' such as are shown in FIGS. 6B and 6C, respectively, may be employed. In these figures, elements substantially equivalent to previously identified elements have been given like numerical designations.

In FIG. 6B, the voice signals which are derived as amplified audio signals from the receiving stations 70, 71 of FIG. 6A are applied to different ones of a pair of band pass filters 77, 78. At least one of the band pass filters 77, 78 is arranged to pass a band of frequencies in the common coherent frequency spectrum of the two signals, this band being chosen, by way of example, as the frequency band $f_3$ to $f_5$ illustrated in FIG. 4. A common coherent frequency spectrum extending between the frequencies $f_3$ to $f_5$ thus reaches the signal multiplying network 44. In this arrangement, however, the mean frequency of the common coherent frequency spectrum is altered by a controllable high frequency accentuating circuit 79 such as an amplifier having a controllable frequency-versus-gain characteristic. The high frequency accentuating circuit 79 is controlled by a separate or secondary correlation output signal derived from a signal multiplying network 82 and an averaging circuit 83.

The principal signal correlating system of this arrangement obtains a product signal from the signal multiplying network 44 which is representative of the derivative of the correlation function, due to the presence of the phase shift circuit 43. The variable delay device 15 is adjusted so as to minimize the relative timing displacement between the mutually coherent signal components, through operation of a servo system 85 (including an averaging circuit or electromechanical device) which is coupled to the delay control mechanism 52. As the variable delay device 15 is operated to "track" the $\tau=0$ relationship, so as to place the mutually coherent signal components in time coincidence, the secondary correlation output signal approaches and ultimately reaches a peak. The high frequency accentuating circuit 79 is controlled correspondingly to provide increasing energy in the higher end of the frequency spectrum $f_3$ to $f_5$ and thus increases the value of $f_m$ so as to effect the desired change in slope of the correlation function.

Different results are obtained by the alternative arrangement 74' shown in FIG. 6C, in which the bandwidth is modified as a result of changes in the relative timing displacement between the mutually coherent signal components. In this instance, the secondary correlation output signal is used to control the frequency limits of each of a variable low pass filter 89 and a variable high pass filter 92. Again using the common coherent frequency spectrum of FIG. 4 as an example, the variable low pass filter 89 is set initially to have an upper limit for the pass band of $f_b$, while the variable high pass filter 92 has a lower limit for its pass band of $f_a$. As the variable delay device 15 is operated to bring the mutually coherent signal components more into time coincidence, the secondary correlation output signal modifies the upper limit of the low pass filter 89 upwards, toward $f_5$, and modifies the lower limit of the high pass filter downward, toward $f_3$. Thus, ultimately, if desired, the entire common coherent frequency spectrum reaches the signal multiplying network 44 as the relative timing displacement of the signal components is adjusted.

For full analysis of the signal information derived by the receiving stations 70, 71 and 72, three signal analyzing systems are employed, and each is coupled to a different pair of the receiving stations. Each signal analyzing system 74, 75 or 76 provides a measurement of the timing displacement between the mutually coherent signal components of a different pair of signals received by the receiving stations 70, 71 and 72. The signal analyzing systems, therefore, provide the basic information needed to determine the position of that aircraft 69 which originated the signals correlated by the different analyzing systems 74, 75 and 76. It should at this point be recognized that some fixed and known delays are introduced by the relatively long lengths of communication line between the different receiving stations 70, 71 and 72 and their associated signal analyzing systems 74, 75 and 76. Preferably, all of the signal analyzing systems 74, 75 and 76 are located at a convenient central location, such as at the location of one of the receiving stations 70, 71 and 72. The known and fixed distances from the spaced-apart receiving stations must therefore be compensated for by fixed delay means or by adequate provision in the subsequent computations which are made.

The information provided by the various signal analyzing systems 74, 75 and 76 is sufficient for the determination of the location of the aircraft 69 which originated the signals which were correlated, because this timing displacement information establishes positional hyperbolae on which the aircraft 69 must be located. The definition of a hyperbola might, in one sense, be considered to be that line drawn relative to two fixed and spaced-apart focal points, which defines all points which are distant from the two focal points by a fixed and common difference. Because of the constancy of the speed of radio propagation, these equal path length differences may be directly equated in a position locating system to equal relative timing displacement values. Therefore, knowing the relative timing displacements between signals (from a common source) which arrive at two receiving stations, a hyperbola may be calculated which defines equal path length differences relative to the two receiving stations which are employed as focal points. The intersection of two of these hyperbolae determine the location of the common source, or aircraft. Because three different receiving stations are needed for defining two intersecting hyperbolae, however, the computation of the third hyperbola provides substantially greater certainty and accuracy without material addition to the complexity.

The mathematical computations which are needed to establish the location of the aircraft by finding the intersection of the hyperbolae is provided by a computer 80 which may be positioned at one of the locations utilized for the signal analyzing systems 74, 75 and 76. The computer 80 may provide output information to control the display of position of the individual aircraft on a position display system 81. Any aircraft entering the zone within which the receiving stations 70, 71 and 72 are to operate therefore may provide signals which may be searched for, acquired and then tracked in a given relationship by the signal analyzing systems 74, 75 and 76 to determine the timing displacement information which is needed for the computer 80 to display the position of the aircraft on the position display system 81.

It has been stated that in the arrangement of FIG. 3 the presence of the phase shift circuit 43 causes a minimum correlation product signal to be provided when the delay introduced between signals A and B is such as to place the mutually coherent signal components of the two signals in time coincidence. Thus a plot of the variations in the value of the correlation output signal does not conform to the $$\frac{\sin x}{x}$$

pattern, but instead (as shown in FIG. 5) conforms to a derivative of the $$\frac{\sin x}{x}$$

pattern and has a zero crossing instead of a first order maxima on the $C_O$ axis. While the zero crossing finder is useful in providing automatic control, it is also feasible to employ systems which operate to seek and track the first order maximum, or peak. One such peak finder system is shown in FIG. 7.

In FIG. 7, the arrangement shown has, for simplicity, been limited to the principal elements needed for a tracking correlation system, and the remaining elements such as those illustrated in the arrangement of FIG. 3 may be included if desired. As in the arrangement of FIG. 3, two signals, A and B, having mutually coherent signal components are applied to the system. Signal B is applied through a variable delay means 84 which is to be adjusted to place the mutually coherent signal components in time coincidence. A pair of signal multiplying networks 86 and 87 are employed instead of the single multiplying network described in FIG. 3. Both signal A and signal B are applied to each of the signal multiplying networks 86 and 87, but signal A is subjected to a short delay by passage through a delay circuit 88 before application to a first of the signal multiplying networks 86. The delay provided by the delay circuit 88 is selected with respect to the time displacement between the first order asymptotic magnitudes of $\tau$ such that the delay is relatively small. Thus two correlation product signals are derived from the signal multiplying networks 86 and 87, but represent products taken at slightly varying intervals in time. Each of the correlation product signals is subjected to time averaging by being passed through a different one of two integrator circuits 90 and 91. The time-averaged signals from the integrator circuits are then applied to an error circuit 93 of any of the types widely employed in servo systems work. When one of the correlation output signals derived from an integrator circuit 90 or 91 is greater than the other, the error circuit 93 provides a signal of a corresponding polarity, while if the converse is true the output of the error circuit 93 is of the opposite polarity. The amplitudes of the signals provided by the error circuit 93 represent the differences between the correlation output signals provided from the integrator circuits 90 and 91.

The error circuit 93, therefore, provides a signal to a servo device 94 which drives a delay control means 96 in a sense to adjust the variable delay means 84 so as to minimize the differences between the correlation output signals. The extent of the adjustment of the variable delay means 84 is indicated by the delay indicator 97, which provides a measure of the timing displacement between the mutually coherent signal components of the two signals. By reference to FIG. 5, it may be seen that the correlation output signals provided by the integrator circuits 90 and 91 will be equal in magnitude only when they are equally displaced on opposite sides of the first order maximum of the $$\frac{\sin x}{x}$$

curves. Again, the system is assumed to operate between the limits defined by the first order asymptotic magnitudes of $\tau$. With the two correlation output signals thus representing time displaced signal samples, the actual timing displacement of the mutually coherent signal components falls half way between the relative timing displacement introduced into the two signals applied to the two signal multiplying networks 86 and 87. Correction for this small factor can be made by adjustment of the delay indicator 97.

The teachings of the present invention may also be employed in different system environments, other than those utilizing tracking correlators. As shown in FIG. 8, various aspects of the invention may be employed in conjunction with a system in which the existence of a source of signals in a certain zone relative to a number of receiving stations may be ascertained. The disposition of the stations may be that shown generally in FIG. 9, in which three stations A, B and C are spaced apart and operate to ascertain the presence of sources in different zones relative to the stations. The zones are defined by the various hyperbolae which define equal path length differences between two particular ones of the stations. As an example, a zone may be defined about the region of intersection of one hyperbola, AB(1), taken relative to the A and B stations 100 and 101 as focal points and a different hyperbola BC(1) taken relative to the B and C stations 101 and 102 as focal points. Each of the hyperbolae AB(1) and BC(1) are the center lines of narrow zones, the margins of which are designated by other hyperbolae, such as AB(1*a*) and BC(1*a*). The system described in FIG. 8 operates to determine the presence of a source within the bounds of the four-sided zone defined within, for example, the intersections of the lines AB(1*a*), BC(1*a*), AB(1*b*) and BC(1*b*).

In a fixed correlation system as thus arranged, the three receiving stations may consist of the A, B and C receivers 100, 101 and 102, respectively, disposed as previously described and each feeding voice signals to the remaining signal processing circuitry which is situated at a central convenient point. The condition in which the presence of a signal source at the approximate location of hyperbola AB(1) in FIG. 1 is indicated when signal A precedes signal B at the A receiver 100 by a known amount. Between the limits AB(1*a*) and AB(1*b*) the system may be operated to provide at least a given value of magnitude of correlation output signal from an AB correlator 104. For this purpose, signals from the B receiver 101 may be applied directly to the AB correlator 104, while signals from the A receiver 100 may be applied through a delay circuit 105, thus providing a relative delay sufficient to approximate the constant difference in path lengths defined by the hyperbola AB(1). The AB correlator 104 may then, in accordance with the present invention, be arranged so as to have a mean frequency sufficient to place the first order asymptotic magnitudes of $\tau$ in a proper relation to the timing displacements represented between the hyperbolae AB(1*a*) and AB(1*b*). The timing displacement of interest in this example may be called $T_V'$ and represents the difference in time which corresponds to the spatial differential between the hyperbolae AB(1*a*) and AB(1*b*). The mean frequency of the common coherent frequency spectrum reaching the AB correlator 104, therefore, is controlled by a band pass filter 106 to be substantially no greater than $$\frac{1}{2T_V'}$$

where the zero crossing finder is used for correlation.

In other words, the variation in timing displacement which is of interest is that between the intervals which are defined by the timing differences which are equivalent to the path length differences of hyperbolae AB(1*a*) and AB(1*b*). When a timing displacement between mutually coherent signal components occurs within this range, an output of more than a selected amplitude is derived from the AB correlator 104, and detected by a threshold detector circuit 107.

In like manner, signals from the B and C receivers 101 and 102 may be applied to a BC correlator 108. Because the hyperbola BC(1) is closer to the B station 101 in FIG. 9 than to the C station 102, a delay is introduced into the signal derived from B receiver 101 by a delay circuit 109 so as to effect the desired relative timing adjustment in the signals applied to the BC correlator 108. Again, the BC correlator 108 may be adjusted in accordance with the previously described aspects of the invention to provide a useful output whenever the source is present between the lines BC(1*a*) and BC(1*b*), and this useful output may be detected by a threshold detector 110. The timing variation of interest here is $T_V''$, representing a timing difference spatially equivalent to the path length difference between the hyperbolae BC(1*a*) and BC(1*b*). A band pass filter 111 having a mean frequency substantially no greater than $$\frac{1}{2T_V''}$$

is again used to control the common coherent frequency spectrum of the zero crossing finder system.

When both threshold detector 107 and threshold detector 110 provide output signals, the source providing signals of interest is identified as being present in the aforementioned zone. This condition is indicated by application of the output signals from the threshold detectors 107 and 110 to a coincidence gate 114 which provides the desired indication.

Although relatively large zones have been indicated for simplifying the description, it will be recognized that the zones between the three stations may be divided up into much more sharply defined zones, thus giving more precise information about the presence of targets or sources of radiation in the region of interest. In other applications, the intersecting zones may be narrowed so sharply that only the passage of a source across a particular checkpoint will be indicated, but this will be useful in many instances. Automatic gain control may be utilized at the different receivers, to permit more accurate correlation if desired.

While there have been described above and illustrated in the drawings various forms of signal analyzing systems, in accordance with the invention, it will be recognized that a number of modifications may be made. Accordingly, the invention should be considered to include all alternatives and variations falling within the scope of the appended claims.

I claim:

1. In a signal analyzing system, the combination of:
first and second terminal means coupled to receive first and second electrical signals having complex multi-frequency components containing mutually coherent signal components;
first means coupled to said first and second terminal means for providing an electrical output signal substantially corresponding to the product of said first and second electrical signals;
controllable signal delay means interposed between at least one of said terminal means and said first means for introducing controllable and known values of relative delay between signals reaching said first means;
second means coupled to said first means and said signal delay means for controlling the value of relative delay introduced by said signal delay means in response to said electrical output signal; and
adjustable bandpass means interposed between at least one of said terminal means and said first means for selectively controlling to a substantial extent the bandwidth of the mutually coherent signal components of the first and second electrical signals reaching said first means.

2. In a signal analyzing system for determining the relative timing displacement of mutually coherent signal components of a first electrical signal and a second electrical signal, the combination of:
a first and a second terminal means adapted to receive the first and the second electrical signals;
signal multiplying network means coupled to said first and second terminal means for providing a product signal;
controllable signal delay means interposed between at least one of said terminal means and said signal multiplying network means for introducing controllable magnitudes of relative delay, having known values, between signals reaching said signal multiplying network means, such that the magnitude of said product signal varies as a function of the magnitude of relative timing displacement between the mutually coherent components reaching the multiplier in an oscillatory fashion about a limiting asymptotic value of magnitude;
second means coupled to said signal multiplying network means and said controllable signal delay means for controlling the magnitude of relative delay introduced by said controllable signal delay means in response to said product signal; and
controllable frequency sensitive filter means interposed between at least one of said terminal means and said signal multiplying network means for controlling the bandwidth of the mutually coherent signal components common to the first and the second electrical signals as they reach the signal multiplying network means, such that the absolute values of the first order asymptotic magnitudes of relative timing displacement between the mutually coherent components of said signals are no greater than $$\frac{1}{4f_m}$$

where $f_m$ is the mean frequency.

3. In a signal analyzing system, the combination of:
first and second terminal means adapted to receive first and second electrical signals having complex multi-frequency components containing mutually coherent signal components;
first means coupled to said first and second terminal means for providing an electrical output signal substantially corresponding to the product of said first and second electrical signals;

second means interposed between at least one of said terminal means and said first means for introducing controllable and known values of relative delay between signals reaching said first means, in response to said electrical output signal; and third means interposed between at least one of said terminal means and said first means for controlling the width of the frequency spectrum characterizing the mutually coherent signal components common to said first and second electrical signals as they reach said first means.

4. In a signal analyzing system, the combination of:

first and second terminal means coupled to receive first and second electrical signals having complex multifrequency components containing mutually coherent signal components;

first means coupled to said first and second terminal means for providing an electrical output signal substantially corresponding to the product of said first and second electrical signals;

controllable signal delay means interposed between at least one of said terminal means and said first means for introducing controllable and known values of relative delay between signals reaching said first means;

second means coupled to said first means and said signal delay means for controlling the value of relative delay introduced by said signal delay means in response to said electrical output signal, said second means operating to provide controllable time averaging of said electrical output signal;

third means interposed between said first and second terminal means and said first means for controlling the width of the frequency spectrum of the mutually coherent signal components of the first and second electrical signals; and fourth means coupled to control said second means and said third means to increase the width of the frequency spectrum of the mutually coherent signal components while decreasing the time averaging interval controlled by said second means.

5. In a signal analyzing system, the combination of:

first and second terminal means adapted to receive first and second electrical signals having complex multifrequency components containing mutually coherent signal components, the relative timing displacement between the mutually coherent signal components falling within a variation range of interest $T_v$;

first means coupled to said first and second terminal means for providing an electrical output signal substantially corresponding to the product of said first and second electrical signals;

controllable signal delay means interposed between one of said terminal means and said first means for introducing controllable and known values of relative delay between signals reaching said first means;

second means coupled to said first means and said signal delay means for controlling the value of relative delay introduced by said signal delay means in response to said electrical output signal, said second means being controllably operable to provide different values of time averaging of the electrical output signal;

controllable frequency sensitive filter means interposed between at least one of said terminal means and said first means for controlling the frequency spectrum of the mutually coherent signal components of the first and second electrical signals which reach said first means;

third means coupled to said controllable frequency sensitive filter means for initially maintaining the mean frequency of the mutually coherent signal components at no greater than $$\frac{1}{2T_v}$$

and initially maintaining the width of the frequency spectrum of the mutually coherent signal components relatively narrow; and fourth means coupled to said first means, said controllable frequency sensitive filter means and said third means for operating said controllable frequency sensitive means to increase the mean frequency and the width of the frequency spectrum of the mutually coherent signal components passed by the controllable frequency sensitive filter means, in response to decreases of said electrical output signal.

6. In a signal analyzsing system for measuring the relative timing displacement between mutually coherent signal components of two electrical signals, the combination of:

first and second terminal means adapted to receive said first and second electrical signals;

first means coupled to said first and second terminal means for providing an electrical product signal from said first and second electrical signals;

controllable signal delay means interposed between one of said terminal means and said first means;

second means coupled to said first means and said signal delay means for controllably changing the value of relative delay introduced by said signal delay means, said second means operating in response to a control signal to provide variable time averaging of said electrical product signal;

controllable frequency sensitive filter means interposed between one of said terminal means and said first means; and third means coupled to said controllable frequency sensitive filter means and said second means for concurrently changing the time averaging interval introduced by said second means, the mean frequency of the mutually coherent signal components reaching said first means, and the width of the frequency spectrum of the mutually coherent signal components reaching said first means, in response to said electrical product signal.

7. An electrical signal correlation system for determining the relative timing displacement between mutually coherent signal components of first and second electrical signals, including the combination of:

controllable frequency sensitive means coupled to receive the first and second electrical signals;

electrical signal multiplying means coupled to the frequency sensitive means for providing a correlation product signal;

variable delay means interposed between the frequency sensitive means and the multiplying means for introducing controllable relative timing displacements bebetween the electrical signals;

servo means responsive to the correlation product signal and coupled to the variable delay means for maintaining the relative timing displacement such that representations of the mutually coherent signal components are provided in time coincidence; and control means responsive to the correlation product signal and coupled to the controllable frequency sensitive means for concurrently modifying the mean frequency and frequency limits of the signals passed by the controllable frequency sensitive means.

8. An electrical signal correlation system for determining the relative timing displacement between mutually coherent signal components of first and second electrical signals having a timing displacement variation within a range $T_v$, including the combination of:

controllable frequency sensitive means coupled to receive the first and second electrical signals;

electrical signal multiplying means coupled to the frequency sensitive means for providing a correlation product signal;

variable delay means interposed between the frequency sensitive means and the multiplying means for introducing controllable relative timing displacements bebetween the electrical signals;

servo means responsive to the correlation product signal and coupled to the variable delay means for maintaining the relative timing displacement such that representations of the mutually coherent signal components are brought into time coincidence, the servo means operating in response to a control signal to provide time averaging over a controllable interval of the correlation product signal; and control means responsive to the value of the correlation product signal and coupled to control the frequency sensitive means and the servo means, the control means operating the frequency sensitive means to maintain the mean frequency of the signals passed by the frequency sensitive means no greater than approximately $$\frac{1}{2T_v}$$

and concurrently increasing the width of the band of frequencies passed by the frequency sensitive means while decreasing the time averaging interval provided by the servo means.

9. An electrical signal correlation system for determining the relative timing displacement between mutually coherent signal components of first and second electrical signals having a timing displacement variation of interest within a range of timing displacements $T_v$, the system operating to provide successive search, acquisition and track phases and including the combination of:

controllable frequency sensitive means coupled to receive the first and second electrical signals, the frequency sensitive means being controllable both as to mean frequency and frequency band limits;

electrical signal multiplying means coupled to the frequency sensitive means for providing a correlation product signal representative of the time-varying product of the first and second electrical signals;

variable delay means interposed between the frequency sensitive means and the multiplying means for introducing controllable relative timing displacements between the electrical signals;

servo means responsive to the correlation product signal and coupled to the variable delay means for maintaining the relative timing displacements between the first and second electrical signals such that representations of the mutually coherent signal components are provided in time coincidence, the servo means operating to provide time averaging of the correlation product signal over controllable time averaging intervals;

control means responsive to the value of the correlation product signal and coupled to control the frequency sensitive means, the control means operating the frequency sensitive means to provide initially a mean frequency which is no greater than $$\frac{1}{2T_v}$$

and relatively narrowly separated frequency band limits, together with a relatively long time averaging interval in the servo means, and thereafter increasing the means frequency, more widely separating the frequency band limits and decreasing the time averaging interval concurrently in correspondence to the decreasing of the correlation product signal; and output indicator means coupled to the variable delay means for indicating the relative timing displacement between the mutually coherent signal components of the first and second electrical signals.

10. A tracking correlator system for providing rapid and accurate search, acquisition and tracking of two electrical signals having mutually coherent signal components, including the combination of:

a correlation multiplier circuit providing product signals in response to applied signals;

controllable means adapted to receive the electrical signals and to apply selected portions of the mutually coherent signal components thereof to the correlation multiplier circuit;

servo means, including delay means interposed between the controllable means and the correlation multiplier circuit, for bringing representations of the mutually coherent signal components into time coincidence in response to the product signals; and control means coupled to the correlation multiplier circuit and the controllable means for increasing the mean frequency and the band width of the selected portions of the mutually coherent signal components as the product signals are successively reduced by operation of the servo means, the mean frequency at any instant being no greater than one-fourth the reciprocal of the maximum expected relative timing displacement between the mutually coherent signal components at that instant.

11. A tracking correlator system for two electrical signals having mutually coherent signal components, including the combination of:

a servo controlled signal correlation system including a correlation multiplier circuit and delay means to bring mutually coherent signal components of electrical signals to be multiplied into time coincidence;

controllable filter means coupled to receive the electrical signals to be correlated and to control the bandwidth of the signals applied to the signal correlation system; and control means coupled to the controllable filter means for maintaining the mean frequency of signals passed by the controllable filter means no greater than one-fourth the reciprocal of the maximum expected relative timing displacement at any given instant of operation.

12. A tracking correlator system for providing rapid and accurate search, acquisition and tracking of the relative timing displacement relationship between mutually coherent signal components of two electrical signals, including the combination of:

a correlation multiplier circuit providing product signals in response to applied signals;

controllable filter means adapted to receive the electrical signals and to apply selected frequency portions of the mutually coherent signal components thereof to the correlation multiplier circuit;

servo means, including delay means interposed between the controllable means and the correlation multiplier circuit, for bringing representations of the mutually coherent signal components into time coincidence in response to the product signals, the servo means providing controllable time averaging of the product signals; and control means coupled to the correlation multiplier circuit and the controllable filter means for increasing the mean frequency of the mutually coherent signal components passed by the controllable filter means in accordance with variations in the product signals, the mean frequency at any instant being no greater than one-half the reciprocal of the variation of interest in the relative timing displacement, and the inherent system error in timing displacement is maintained smaller than the expected timing displacement variation at any instant.

13. A tracking correlator system for providing rapid and accurate search, acquisition and tracking of the relative timing displacement relationship of mutually coherent signal components of two electrical signals, including the combination of:

a correlation multiplier circuit providing product signals in response to applied signals;

controllable filter means adapted to receive the electrical signals and to apply selected frequency portions of the mutually coherent signal components thereof to the correlation multiplier circuit;

variable delay means interposed between the controllable filter means and the correlation multiplier circuit for bringing representations of the mutually coherent signal components into time coincidence;

servo means coupled to the correlation multiplier circuit and the variable delay means for operating the variable delay means in response to the product signals from the correlation multiplier circuit for establishing a time coincident relationship between the mutually coherent signal components, the servo means including a feedback signal generating circuit responsive to the rate of movement of the servo means and coupled to provide a negative feedback action for time averaging of the product signals;

controllable feedback gain control means interposed in the feedback signal path; and control means coupled to receive the product signals from the correlation multiplier circuit and to control the controllable filter means and the feedback gain control means in accordance with the product signals.

References Cited in the file of this patent

UNITED STATES PATENTS

| | | |
|---|---|---|
| 2,166,991 | Guanella | July 25, 1939 |
| 2,688,124 | Doty et al. | Aug. 31, 1954 |
| 2,718,638 | De Rosa et al. | Sept. 20, 1955 |
| 2,840,308 | Van Horne | June 24, 1958 |
| 2,938,670 | Bolie | May 31, 1960 |
| 2,984,801 | Pflaum | May 16, 1961 |
| 3,068,474 | Higgins et al. | Dec. 11, 1962 |

OTHER REFERENCES

Thaler and Brown: Servo-mechanism Analysis, McGraw-Hill, 1953, pp. 220–223.